(12) United States Patent
Cardin

(10) Patent No.: US 11,946,912 B2
(45) Date of Patent: Apr. 2, 2024

(54) SYSTEM AND METHOD OF TRACE-LEVEL ANALYSIS OF CHEMICAL COMPOUNDS

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 119 days.

(21) Appl. No.: 17/364,517

(22) Filed: Jun. 30, 2021

(65) Prior Publication Data

US 2021/0404995 A1    Dec. 30, 2021

Related U.S. Application Data

(60) Provisional application No. 63/046,454, filed on Jun. 30, 2020.

(51) Int. Cl.
| | |
|---|---|
| *G01N 30/14* | (2006.01) |
| *G01N 30/12* | (2006.01) |
| *G01N 30/02* | (2006.01) |

(52) U.S. Cl.
CPC ............ *G01N 30/12* (2013.01); *G01N 30/14* (2013.01); *G01N 2030/025* (2013.01); *G01N 2030/128* (2013.01); *G01N 2030/143* (2013.01)

(58) Field of Classification Search
CPC ........ G01N 30/02; G01N 30/12; G01N 30/14; G01N 2030/025; G01N 2030/128; G01N 2030/143
See application file for complete search history.

(56) References Cited

U.S. PATENT DOCUMENTS 3,462,918 A * 8/1969 Prosser ............... G01N 30/08
                                                          95/87
4,180,389 A   12/1979 Paul
(Continued)

FOREIGN PATENT DOCUMENTS

| CN | 1346055 A | 4/2002 |
|---|---|---|
| CN | 1793903 A | 6/2006 |

(Continued)

OTHER PUBLICATIONS

Corrected Notice of Allowance received for U.S. Appl. No. 16/593,934, dated Nov. 30, 2022, 2 pages.
(Continued)

*Primary Examiner* — Jamel E Williams
*Assistant Examiner* — Alex T Devito
(74) *Attorney, Agent, or Firm* — Kubota & Basol LLP

(57) ABSTRACT

Techniques disclosed herein can be used to perform a rapid, splitless injection of a sample including SVOCs and VOCs. In some embodiments, a system includes two focusing traps combined in series, one inside of a GC oven and one in a separate oven to concentrate the SVOCs inside of the GC oven and concentrate the VOCs outside of the GC oven. Heating the VOC focusing trap and reversing the flow through both focusers allows splitless injection of compounds boiling from as low as −100° C. to as high as 600° C. in a single analysis, with a narrow injection bandwidth to optimize both sensitivity and the resolving power of the analyzer.

14 Claims, 5 Drawing Sheets

(56) References Cited

U.S. PATENT DOCUMENTS

| | | |
|---|---|---|
| 4,293,316 A | 10/1981 | Block |
| 4,883,504 A * | 11/1989 | Gerstel .................. G01N 30/32 96/104 |
| 5,014,541 A | 5/1991 | Sides et al. |
| 5,135,549 A | 8/1992 | Phillips et al. |
| 5,141,534 A | 8/1992 | Sacks et al. |
| 5,187,972 A | 2/1993 | Defriez |
| 5,191,211 A | 3/1993 | Gorman, Jr. |
| 5,268,302 A * | 12/1993 | Rounbehler ........... G01N 31/12 422/89 |
| 5,288,310 A | 2/1994 | Peters et al. |
| 5,392,634 A | 2/1995 | Asano et al. |
| 5,402,668 A | 4/1995 | Murakami et al. |
| 5,449,902 A | 9/1995 | Onishi et al. |
| 5,492,555 A | 2/1996 | Strunk et al. |
| 5,545,252 A * | 8/1996 | Hinshaw ................ G01N 30/32 95/82 |
| 5,547,497 A | 8/1996 | Klemp et al. |
| 5,596,876 A | 1/1997 | Manura et al. |
| 5,720,798 A | 2/1998 | Nickerson et al. |
| 5,795,368 A | 8/1998 | Wright et al. |
| 5,847,291 A | 12/1998 | Green et al. |
| 5,929,321 A | 7/1999 | Bertrand |
| 6,086,767 A | 7/2000 | Walters et al. |
| 6,223,584 B1 | 5/2001 | Mustacich et al. |
| 6,257,047 B1 | 7/2001 | Grob et al. |
| 6,614,228 B2 | 9/2003 | Hofmann et al. |
| 6,632,268 B2 | 10/2003 | Seeley |
| 6,649,129 B1 | 11/2003 | Neal |
| 6,989,129 B2 | 1/2006 | Licklider et al. |
| 7,451,634 B2 | 11/2008 | Gamache et al. |
| 7,642,089 B2 | 1/2010 | Pieper et al. |
| 7,647,812 B2 | 1/2010 | Arnold et al. |
| 7,823,439 B2 | 11/2010 | Fisher |
| 8,075,842 B1 | 12/2011 | Meece et al. |
| 8,143,071 B2 | 3/2012 | Gjerde |
| 8,613,215 B2 | 12/2013 | Lambertus et al. |
| 8,621,912 B2 | 1/2014 | Guieze |
| 9,188,568 B2 | 11/2015 | Ebeler et al. |
| 9,228,984 B2 | 1/2016 | Lu et al. |
| 9,240,311 B2 | 1/2016 | Whitehouse et al. |
| 9,627,188 B2 | 4/2017 | Ariya et al. |
| 2001/0027722 A1 | 10/2001 | Bremer et al. |
| 2003/0109794 A1 | 6/2003 | Phillips |
| 2005/0014156 A1 | 1/2005 | Pawliszyn |
| 2005/0124076 A1 | 6/2005 | Tseng et al. |
| 2006/0153740 A1 | 7/2006 | Sultan et al. |
| 2006/0154377 A1 | 7/2006 | Lambert et al. |
| 2006/0191414 A1 | 8/2006 | Lange et al. |
| 2006/0245975 A1 | 11/2006 | Tipler et al. |
| 2007/0017868 A1 | 1/2007 | Grimm |
| 2007/0071638 A1 | 3/2007 | Kraiczek et al. |
| 2007/0077176 A1 | 4/2007 | Lambert et al. |
| 2008/0264491 A1 | 10/2008 | Klee et al. |
| 2008/0289397 A1 | 11/2008 | Hassan et al. |
| 2009/0238722 A1 | 9/2009 | Mora-Fillat et al. |
| 2010/0022764 A1 | 1/2010 | Otoshi et al. |
| 2010/0242579 A1 | 9/2010 | Tipler et al. |
| 2011/0079143 A1 | 4/2011 | Marotta et al. |
| 2013/0052113 A1 | 2/2013 | Molins et al. |
| 2014/0299547 A1 | 10/2014 | Muller-spath et al. |
| 2014/0345370 A1 | 11/2014 | Marotta |
| 2015/0233876 A1 | 8/2015 | Dellea et al. |
| 2015/0314267 A1 | 11/2015 | Schammel et al. |
| 2016/0033462 A1 | 2/2016 | Singer et al. |
| 2016/0320354 A1 | 11/2016 | Cretnik et al. |
| 2016/0332141 A1 | 11/2016 | Machida et al. |
| 2017/0284978 A1 | 10/2017 | Cardin |
| 2018/0065078 A1 | 3/2018 | Hayes et al. |
| 2018/0067091 A1 | 3/2018 | Burkhalter et al. |
| 2018/0180590 A1 | 6/2018 | Hall et al. |
| 2018/0246071 A1 | 8/2018 | Cardin |
| 2019/0118171 A1 | 4/2019 | Cardin |
| 2019/0137458 A1 | 5/2019 | Cardin |
| 2019/0154638 A1 | 5/2019 | Cardin |
| 2020/0033301 A1 | 1/2020 | Cardin |

FOREIGN PATENT DOCUMENTS

| | | | |
|---|---|---|---|
| CN | 101609072 A | 12/2009 | |
| CN | 102393429 A | 3/2012 | |
| CN | 102302886 B | 8/2013 | |
| CN | 103499662 A | 1/2014 | |
| CN | 104297386 A | 1/2015 | |
| CN | 104597149 A | 5/2015 | |
| CN | 104792604 A | 7/2015 | |
| CN | 204630990 U | 9/2015 | |
| CN | 105044244 A | 11/2015 | |
| CN | 105044296 A | 11/2015 | |
| CN | 105578959 A | 5/2016 | |
| CN | 205333581 U | 6/2016 | |
| CN | 107677739 A | 2/2018 | |
| CN | 108387668 A | 8/2018 | |
| EP | 0597602 A1 | 5/1994 | |
| EP | 0806661 A1 | 11/1997 | |
| EP | 2757369 A1 | 7/2014 | |
| ES | 2311396 A1 | 2/2009 | |
| FR | 2607255-1 * | 5/1988 | |
| JP | H06-194351 A | 7/1994 | |
| JP | H07-253421 A | 10/1995 | |
| JP | H11-248694 A | 9/1999 | |
| JP | H11-304784 A | 11/1999 | |
| JP | 2000-227425 A | 8/2000 | |
| JP | 2002-39923 A | 2/2002 | |
| JP | 2003-262625 A | 9/2003 | |
| JP | 2005-283317 A | 10/2005 | |
| JP | 2009-2711 A | 1/2009 | |
| JP | 2009-69053 A | 4/2009 | |
| JP | 2009-236539 A | 10/2009 | |
| JP | 2010-112761 A | 5/2010 | |
| JP | 2014-529080 A | 10/2014 | |
| JP | 2016-109298 A | 6/2016 | |
| JP | 2017-173281 A | 9/2017 | |
| WO | WO-9325293 A1 * | 12/1993 | ......... B01D 11/0415 |
| WO | WO-0125781 A2 * | 4/2001 | ............. B01F 3/022 |
| WO | 2011/099079 A1 | 8/2011 | |
| WO | 2013/073693 A1 | 5/2013 | |
| WO | 2018/191758 A1 | 10/2018 | |
| WO | 2019/104226 A1 | 5/2019 | |

OTHER PUBLICATIONS

Examiner's Answer to Appeal Brief received for U.S. Appl. No. 15/479,122, mailed on Apr. 7, 2020, 22 pages.

Final Office Action received for U.S. Appl. No. 15/479,122, dated Apr. 23, 2018, 14 pages.

Final Office Action received for U.S. Appl. No. 16/593,934, dated Jul. 12, 2021, 10 pages.

Restek, "HayeSep D Specification Sheet", HayeSep Packing Materials, https://www.restek.com/catalog/view/617, [retrieved on Oct. 22, 2020], 2020, 2 pages.

International Search Report received for PCT Patent Application No. PCT/US2017/025993, dated Jul. 4, 2017, 5 pages.

International Search Report received for PCT Patent Application No. PCT/US2018/057151, dated Feb. 12, 2019, 3 pages.

International Search Report received for PCT Patent Application No. PCT/US2018/058349, dated Feb. 12, 2019, 3 pages.

International Search Report received for PCT Patent Application No. PCT/US2018/062327, dated Mar. 6, 2019, 4 pages.

International Search Report received for PCT Patent Application No. PCT/US2020/053346, dated Dec. 11, 2020, 4 pages.

International Search Report received for PCT Patent Application No. PCT/US2021/039986, dated Oct. 21, 2021, 5 pages.

Non-Final Office Action received for U.S. Appl. No. 15/479,122, dated Dec. 4, 2017, 12 pages.

Non-Final Office Action received for U.S. Appl. No. 15/479,122, dated Dec. 17, 2018, 13 pages.

Non-Final Office Action received for U.S. Appl. No. 16/197,791, dated Oct. 7, 2020, 12 pages.

(56) References Cited

OTHER PUBLICATIONS

Non-Final Office Action received for U.S. Appl. No. 16/593,934, dated Dec. 24, 2021, 6 pages.
Non-Final Office Action received for U.S. Appl. No. 16/593,934, dated Oct. 6, 2020, 9 pages.
Non-Final Office Action received for U.S. Appl. No. 16/175,230, dated Oct. 28, 2020, 24 pages.
Notice of Allowance received for U.S. Appl. No. 15/479,122, dated Mar. 24, 2021, 7 pages.
Notice of Allowance received for U.S. Appl. No. 16/168,605, dated Oct. 14, 2021, 9 pages.
Notice of Allowance received for U.S. Appl. No. 16/175,230, dated Jul. 7, 2021, 10 pages.
Notice of Allowance received for U.S. Appl. No. 16/197,791, dated Jul. 14, 2021, 9 pages.
Notice of Allowance received for U.S. Appl. No. 16/593,934, dated Aug. 30, 2022, 8 pages.
Patent Board Decision received for U.S. Appl. No. 15/479,122, dated Mar. 19, 2021, 7 pages.
Search Report received for Chinese Patent Application No. 201780029443.5, dated Jan. 26, 2021, 5 pages (2 pages of English Translation and 3 pages of Official Copy).
Search Report Received for Chinese Patent Application No. 201880069708.9 dated May 9, 2022, 7 pages (3 pages of English Translation and 4 pages of Official Copy).
Supplemental Notice of Allowability received for U.S. Appl. No. 16/175,230, dated Sep. 30, 2021, 2 pages.
Supplemental Notice of Allowance received for U.S. Appl. No. 15/479,122, dated Apr. 1, 2021, 2 pages.
Agilent, "Capillary PoraPLOT Q", Agilent, Available online at: <https://www.agilent.com/en/products/gas-chromatography/gc-columns/capillary/poraplot-q>, 5 pages.
Aguilar et al., "Equilibrium-Sorptive Enrichment: A Novel Technique for Trace Analysis in Air", Journal of High Resolution Chromatography, vol. 22, No. 4, Apr. 1, 1999, pp. 231-234.
Andrews et al., "Technical Note: A Fully Automated Purge and Trap GC-MS System for Quantification of Volatile Organic Compound (VOC) Fluxes Between the Ocean and Atmosphere", Ocean Science, vol. 11, Apr. 23, 2015, pp. 313-321.
Barro et al., "Analysis of Industrial Contaminants in Indoor Air: Part 1. Volatile Organic Compounds, Carbonyl Compounds, Polycyclic Aromatic Hydrocarbons and Polychlorinated Biphenyls", Journal of Chromatography A, vol. 1216, No. 3, Jan. 16, 2009, pp. 540-566.
Braun et al., "Studies of Polystyrene in the Region of the Glass Transition Temperature by Inverse Gas Chromatography", Macromolecules, vol. 8, No. 6, Nov.-Dec. 1975, pp. 882-888.
Broadway et al., "White Paper Gas Chromatography", PerkinElmer Inc., 2009, 13 pages.
Choe et al., "A Study on Trapping CO2 Using Molecular Sieve for 14C AMS Sample Preparation", Radiocarbon, vol. 55, Nos. 2-3, 2013, pp. 421-425.
GL Sciences Inc., "Multipurpose Sampling Thermal Desorption System MSTD258", Available online at: <https://www.glsciences.com/c-product/sample/sa-instruments/multipurpose-sampling-thermal-desorption-system-mstd258/>, [retrieved on Sep. 10, 2018], 4 pages.
Gowlowski et al., "Dry Purge for the Removal of Water From the Solid Sorbents Used to Sample Volatile Organic Compounds From the Atmospheric Air", Analyst, vol. 5, No. 11, 2000, pp. 2112-2117.
Harper, M., "Sorbent Trapping of Volatile Organic Compounds from Air", Journal of Chromatography A, vol. 885, No. 1-2, 2000, pp. 129-151.
Materic et al., "Methods in Plant Foliar Volatile Organic Compounds Research", Applications in Plant Sciences, vol. 3, No. 12, Dec. 2015, pp. 1-10.
McClenny et al., "Analysis of VOCs in Ambient Air Using Multisorbent Packings for VOC Accumulation and Sample Drying", Journal of the Air & Waste Association, vol. 45, No. 10, Oct. 1995, pp. 792-800.
McLaughlin et al., "Determination of Dexamethasone in Bovine Tissues by Coupled-Column Normal-Phase High-Performance Liquid Chromatography and Capillary Gas Chromatography—Mass Spectrometry", Journal of Chromatography B: Biomedical Sciences and Applications, vol. 529, No. 1, Available Online at: <https://www.sciencedirect.com/science/article/abs/pii/S0378434700838037>, Jul. 13, 1990, pp. 1-19.
Miller et al., "Medusa: A Sample Preconcentration and GC/MS Detector System for in Situ Measurements of Atmospheric Trace Halocarbons, Hydrocarbons, and Sulfur Compounds", Analytical Chemistry, vol. 80, No. 5, Jan. 31, 2008, pp. 1536-1545.
Novaes et al., "New Approaches to Monitor Semi-Volatile Organic Compounds Released During Coffee Roasting Using Flow-Through/active Sampling and Comprehensive Two-Dimensional Gas Chromatography", Food Research International, vol. 119, Feb. 5, 2019, pp. 349-358.
Packham et al., "Complex Sample Analysis by Cybernetic Multi-dimensional Chromatography", Analytical Proceedings, vol. 26, Available online at: <https://pubs.rsc.org/en/content/articlelanding/1989/ap/ap9892600119/unauth#!divAbstract>, Oct. 1989, pp. 336-352.
Restek, "PLOT Columns Instruction Sheet", Restek Chromatography Products, Jun. 2019, 2 pages.
Sacks et al., "High-Speed GC Analysis of VOCs: Tunable Selectivity and Column Selection", Environmental Science & Technology, vol. 28, No. 9, 1994, pp. 428A-433A.
Tang et al., "Determination of C1-C4 Hydrocarbons in Air", Analytical Chemistry, vol. 65, No. 14, Jul. 15, 1993, pp. 1932-1935.
Tanner et al., "Gas Chromatography System for the Automated, Unattended, and Cryogen-Free Monitoring of C2 to C6 Non-Methane Hydrocarbons in the Remote Troposphere", Journal of Chromatography A, vol. 1111, Feb. 21, 2006, pp. 76-88.
UOP LLC, "HiSiv 3000, Adsorbent", Available online at: <https://www.chemia.ch/upload/files/pdf/GB%20industrie/1445/PDHiSiv3000.pdf>, Dec. 31, 2006, 1 page.
Wang et al., "Automated Gas Chromatography with Cryogenic/Sorbent Trap for the Measurement of Volatile Organic Compounds in the Atmosphere", Journal of Chromatography A, vol. 863, No. 2, 1999, pp. 183-193.
Welthagen et al., "Search Criteria and Rules for Comprehensive Two-Dimensional Gas Chromatography-Time-of-Flight Mass Spectrometry Analysis of Airborne Particulate Matter", Journal of Chromatography A, vol. 1019, Nos. 1-2, Nov. 26, 2003, pp. 233-249.

* cited by examiner

SYSTEM AND METHOD OF TRACE-LEVEL ANALYSIS OF CHEMICAL COMPOUNDS

CROSS-REFERENCE TO RELATED APPLICATION

This application claims the benefit of U.S. Provisional Patent Application No. 63/046,454, filed on Jun. 30, 2020, the entire disclosure of which is incorporated herein by reference in its entirety for all purposes.

FIELD OF THE DISCLOSURE

The disclosure relates to chemical analysis and, more particularly, the analysis of SVOCs and VOCs in a single, splitless injection.

BACKGROUND OF THE DISCLOSURE

Most analytical techniques for analysis of compounds by GCMS target either the volatile or the semi-volatile fraction of the sample, and typically not both. That is, the low boiling compounds (e.g., −50° C. to 230° C.) are analyzed using a different sample preparation and introduction technique than is typically used for higher boiling compounds (e.g., 120° C. to 550+° C.). The lower boiling compounds are generally referred to as Volatile Organic Compounds (VOCs) while the heavier compounds are call Semi-Volatile Organic Compounds (SVOCs). When SVOCs are injected onto a column, either from a solvent extract via the heated expansion of a 1 microliter liquid injection, or by thermal desorption from a collection/enrichment device, the SVOCs will "stick" to the analytical capillary column in the GC, allowing the sample to be deposited over a period of 0.5-4 minutes while maintaining a narrow deposition band on the GC column. However, lighter VOC compounds do not "stick" to the column at the typical GC starting temperature (e.g., 30-40° C.), but will move through the GC column when injected onto a typical WCOT capillary column (Wall Coated Open Tubular) column. Since optimal capillary column GC peak widths are about 2-6 seconds wide, techniques that introduce the sample onto the column over 1-4 minutes would not yield the desired, narrow peaks for lighter VOC compounds that have increased mobility through WCOT columns compared to SVOC compounds.

As an example, one approach for reducing the bandwidth upon injection is to split the sample so that only part of the sample goes onto the column and the rest exits through a vent. For example, if 2 cc of gas phase sample is delivered to the GC column at a flow rate of 1 cc/min, a splitless injection would take 2 minutes to introduce the sample, causing substantial band broadening and loss of resolution for lighter compounds that are mobile on the GC column at the GC oven's starting temperature. However, if the sample was split 20:1 between the GC column and an outlet vent, then injection would instead take 6 seconds (e.g., 120 seconds divided by 20), thereby providing acceptable peak width for capillary chromatography, but at the expense of throwing away 95% of the sample through the outlet vent in this example.

As another example, it is possible to reduce the VOC bandwidth by increasing the retention (e.g., chemical affinity to the sample) or "strength" of the GC column. Porous Layer Open Tubular (PLOT) GC columns have a layer of adsorbent material on the walls, and tend to be much stronger (e.g., have higher chemical affinity to the sample) than the WCOT columns that use a polymer wall coating. For example, PLOT columns cause the VOCs to "stick" to the column during injection, but these columns will not allow the heavier SVOCs to elute at reasonable GC oven temperatures, so PLOT columns cannot be used when both VOCs and SVOCs are to be analyzed in a single analysis.

Another approach includes using a focusing trap to reduce the volume of the injected VOCs to allow them to be delivered without splitting to the GC WCOT column. Focusing has been done either using a micro packed trap, or by using a liquid nitrogen focusing trap. Micro-Packed traps will reduce the volume of the sample, but typically will not deliver the sample fast enough to a capillary trap without at least a small split operation (e.g., 3:1) which doesn't allow sensitivity to be maximized. Using liquid nitrogen to focus the VOCs is an option, but this kind of trap will also focus all of the water vapor in the original sample, and excess water can affect both GC performance and the sensitivity of the detector, such as a mass spectrometer (MS). In addition, focusing traps may not be compatible with SVOC analysis, as they typically do not achieve high enough temperatures to release the heavier SVOC compounds (e.g., during desorption).

SUMMARY OF THE DISCLOSURE

The disclosure relates to chemical analysis and, more particularly, the analysis of SVOCs and VOCs in a single, splitless injection. Embodiments of the present disclosure focus both VOCs and SVOCs in a single injection, allow a splitless delivery to the GC column of both fractions, and eliminate excess water vapor. This approach includes a SVOC trap in the GC oven for retaining heavy compounds, followed by a multi-capillary column VOC trap with a separate heating source to focus the more volatile compounds in a sample delivered from a thermal desorber or other sample introduction system. In some embodiments, focusing the SVOCs inside of the GC oven can reduce or eliminate losses or inferior chromatographic performance caused by thermal gradients or "cold spots" in the focused sample during delivery to the GC column. The multi-capillary column VOC trap downstream of the SVOC capillary trap can concentrate the VOCs while allowing the water vapor to continue through the trap. Once the sample has been injected and the water sufficiently removed through both the SVOC and VOC traps by a short flush with an inert gas, the VOC trap is desorbed and backflushed through the SVOC trap to the GC separation column (also called the analytical column) while starting to heat the GC oven. Finally, the SVOC focusing column can be backflushed to a vent after all compounds of interest have been transferred to the analytical column to remove the heaviest compounds that may not be desirable in the analysis. In some embodiments, the analytical column is chosen to allow the VOCs and SVOCs to separate while the oven temperature is increased during the analysis. Rapidly injected VOCs will retain a narrow peak width, requiring less separation on the analytical column to fully resolve compounds from one another (4 second wide peaks need to only separate by 4 seconds, whereas 8 second wide peaks must separate by 8 seconds), thereby allowing a thinner film, less retentive column to be used (0.5 um) for the analytical column, for example. Retaining the narrow peak widths of the injected VOCs can be important because typical thick film VOC columns (1-3 um) may not allow heavier SVOCs to elute without using oven temperatures that could cause thermal breakdown of the column and compounds (e.g., above 300-350° C.). Due to these challenges, rapid injection of the VOCs with prior water removal has been one of the primary barriers in allowing both VOCs and SVOCs to be analyzed in the same analysis Embodiments of the disclosure improve the trace level analysis by GCMS of chemicals encompassing a wide boiling point range. Pre-focusing the sample allows narrow peak widths on-column to improve compound separation and sensitivity. The disclosed configuration allows for a much larger boiling point range to be analyzed in a single analysis, at concentrations lower than previously possible by eliminating the need to perform a split injection. Pre-focusing the VOCs of the sample with multiple capillary columns of increasing strength followed by preheating the multiple capillary columns under zero flow allows all compounds to achieve a fast, splitless injection rate onto the GC analytical column to lower detection limits when using a detector such as a Mass Spectrometer (MS). Embodiments of the disclosure allow the sample to be focused and redirected onto the primary analytical GC column without requiring rotary valves, simply by using a pressure switch. The elimination of packed traps and rotary valves significantly improves the system performance relative to prior technology.

DETAILED DESCRIPTION

Figure 1A:
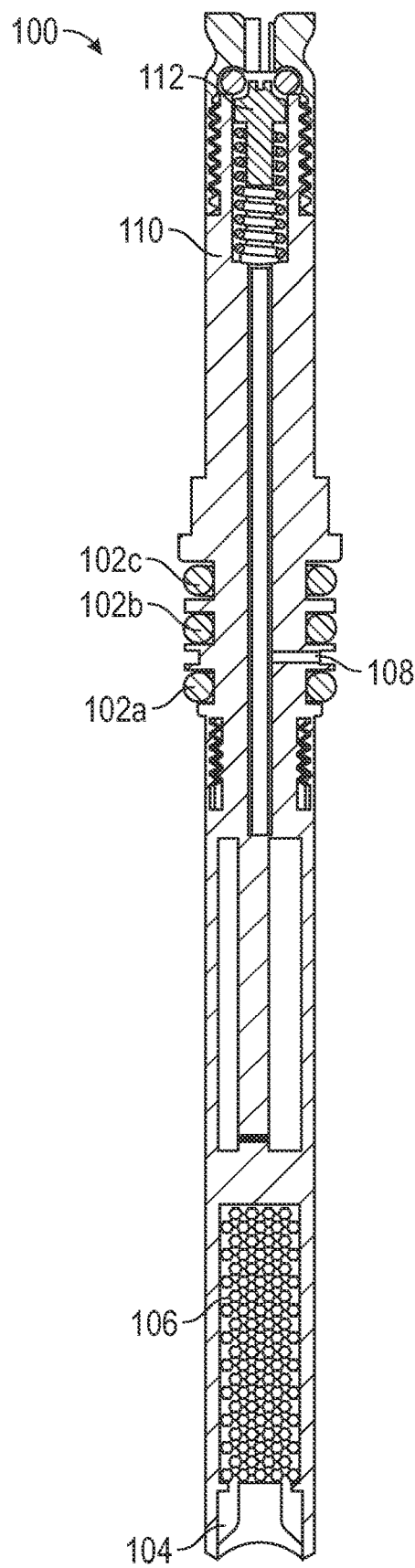
FIGS. 1A and 1B illustrate examples of sample extraction devices 100 and 150 that can enrich a sample containing both VOCs and SVOCs prior to thermal desorption into a GC or GCMS according to some embodiments of the disclosure.

In the following description, reference is made to the accompanying drawings which form a part hereof, and in which it is shown by way of illustration specific examples that can be practiced. It is to be understood that other examples can be used, and structural changes can be made without departing from the scope of the examples of the disclosure.

The disclosure relates to chemical analysis and, more particularly, the analysis of SVOCs and VOCs in a single, splitless injection. Embodiments of the present disclosure focus both VOCs and SVOCs in a single injection, allow a splitless delivery to the GC column of both fractions, and eliminate excess water vapor. This approach includes a SVOC trap in the GC oven for retaining heavy compounds, followed by a multi-capillary column VOC trap with a separate heating source to focus the more volatile compounds in a sample delivered from a thermal desorber or other sample introduction system. In some embodiments, focusing the SVOCs inside of the GC oven can reduce or eliminate losses or inferior chromatographic performance caused by thermal gradients or "cold spots" in the focused sample during delivery to the GC column. The multi-capillary column VOC trap downstream of the SVOC capillary trap can concentrate the VOCs while allowing the water vapor to continue through the trap. Once the sample has been injected and the water sufficiently removed through both the SVOC and VOC traps by a short flush with an inert gas, the VOC trap is desorbed and backflushed through the SVOC trap to the GC separation column (also called the analytical column) while starting to heat the GC oven. Finally, the SVOC focusing column can be backflushed to a vent after all compounds of interest have been transferred to the analytical column to remove the heaviest compounds that may not be desirable in the analysis. In some embodiments, the analytical column is chosen to allow the VOCs and SVOCs to separate while the oven temperature is increased during the analysis. Rapidly injected VOCs will retain a narrow peak width, requiring less separation on the analytical column to fully resolve compounds from one another (4 second wide peaks need to only separate by 4 seconds, whereas 8 second wide peaks must separate by 8 seconds), thereby allowing a thinner film, less retentive column to be used (0.5 um) for the analytical column, for example. Retaining the narrow peak widths of the injected VOCs can be important because typical thick film VOC columns (1-3 um) may not allow heavier SVOCs to elute without using oven temperatures that could cause thermal breakdown of the column and compounds (e.g., above 300-350° C.). Due to these challenges, rapid injection of the VOCs with prior water removal has been one of the primary barriers in allowing both VOCs and SVOCs to be analyzed in the same analysis Embodiments of the disclosure improve the trace level analysis by GCMS of chemicals encompassing a wide boiling point range. Pre-focusing the sample allows narrow peak widths on-column to improve compound separation and sensitivity. The disclosed configuration allows for a much larger boiling point range to be analyzed in a single analysis, at concentrations lower than previously possible by eliminating the need to perform a split injection. Pre-focusing the VOCs of the sample with multiple capillary columns of increasing strength followed by preheating the multiple capillary columns under zero flow allows all compounds to achieve a fast, splitless injection rate onto the GC analytical column to lower detection limits when using a detector such as a Mass Spectrometer (MS). Embodiments of the disclosure allow the sample to be focused and redirected onto the primary analytical GC column without requiring rotary valves, simply by using a pressure switch. The elimination of packed traps and rotary valves significantly improves the system performance relative to prior technology.

Figure 1B:
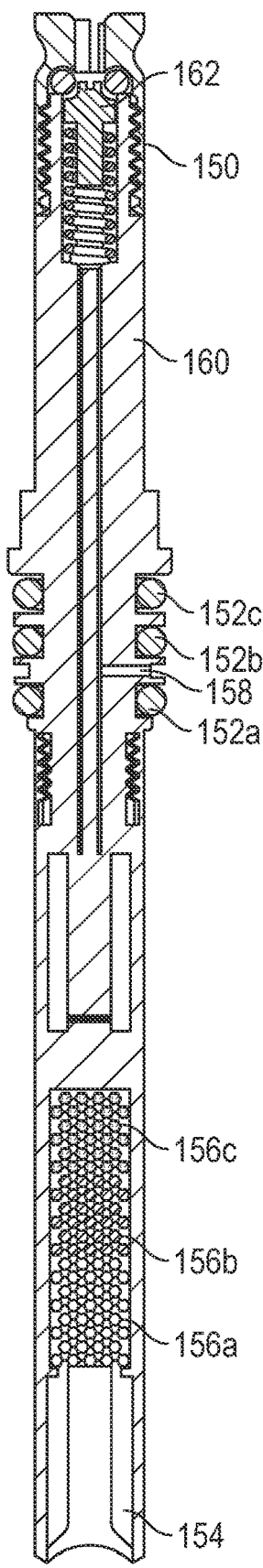

FIGS. 1A and 1B illustrate examples of sample extraction devices 100 and 150 that can enrich a sample containing both VOCs and SVOCs prior to thermal desorption into a GC or GCMS according to some embodiments of the disclosure. Referring to FIG. 1A, sample extraction device 100 includes a body 110, external seals 102a-c, a cavity 104 containing a sorbent 106, a port 108, and an internal seal 112. In some embodiments, cavity 104 is disposed inside of the body 110 and is fluidly coupled to port 108 and internal seal 112. In some embodiments, the external seals 102a-c are disposed around the outside of the body 110 of the sample extraction device 100. In some embodiments, port 108 fluidly couples the inside of body 110 to the environment of the sample extraction device 100 and is disposed between two of the external seals 102a and 102b. In some embodiments, positioning port 108 between external seals 102a and 102b enables selectively sealing the port 108 by inserting the sample extraction device 100 into a container (e.g., a sample vial) sized such that seals 102a-c are in contact with a surface of the container (e.g., an inner surface of the sample vial). In some embodiments, port 108 can be fluidly coupled to a system by inserting the sample extraction device 100 into, for example, a desorption device such that port 108 is coupled to a carrier fluid supply and/or an inlet of a chemical analysis system. In some embodiments, external seals 102*a-c* can prevent air from being introduced into the system (e.g., while the sample extraction device 100 is inserted into a desorption device), while directing a desorb gas flow through the internal sorbent 106 during thermal desorption to an analyzer (e.g., a GC or GCMS).

FIG. 1B illustrates a sample extraction device 150 similar to sample extraction device 100. In some embodiments, sample extraction device 150 includes a body 160, external seals 152*a-c*, a cavity 154 containing a plurality of sorbents 156*a-c*, a port 158, and an internal seal 162. In some embodiments, cavity 154 is disposed inside of the body 160 and is fluidly coupled to port 158 and internal seal 162. In some embodiments, the external seals 152*a-c* are disposed around the outside of the body 160 of the sample extraction device 100. In some embodiments, port 158 fluidly couples the inside of body 160 to the environment of the sample extraction device 150 and is disposed between two of the external seals 152*a* and 152*b*. In some embodiments, positioning port 158 between external seals 152*a* and 152*b* enables selectively sealing the port 158 by inserting the sample extraction device 150 into a container (e.g., a sample vial) sized such that seals 152*a-c* are in contact with a surface of the container (e.g., an inner surface of the sample vial). In some embodiments, port 158 can be fluidly coupled to a system by inserting the sample extraction device 150 into, for example, a desorption device such that port 158 is coupled to a carrier fluid supply and/or an inlet of a chemical analysis system. In some embodiments, external seals 152*a-c* can prevent air from being introduced into the system (e.g., while the sample extraction device 150 is inserted into a desorption device), while directing a desorb gas flow through the internal sorbents 156*a-c* during thermal desorption to an analyzer (e.g., a GC or GCMS). In some embodiments, sorbents 156*a-c* can be arranged in order of increasing chemical affinity to one or more compounds of interest in a sample. For example, sorbent 156*a* can have a relatively low chemical affinity, sorbent 156*b* can have a higher chemical affinity than sorbent 156*a*, and sorbent 156*c* can have the highest chemical affinity of the sorbents.

Sample extraction devices 100 and/or 150 can collect the sample using an active flow of gas, a static diffusive flow, or by sealing the sample extraction devices 100 and/or 150 inside of a vial under vacuum. In some embodiments, pulling a vacuum on the sample while the sample extraction device 100 and/or 150 is sealed in the sample vial containing the sample can improve the rate of extraction, especially for the extraction of the higher boiling point compounds. In some situations, sample extraction device 100 and/or 150 has the capacity to collect a large amount of sample but may not release the collected sample fast enough to achieve narrow peak widths for VOCs. In some situations, sample can be released more quickly from sample extraction devices 100 and/or 150 using a split injection. However, as described previously, split injections cause a subsequent loss in sensitivity relative to splitless injections where 100% of the sample is directed to the analytical column and then to the detector, for example. Thus, in some embodiments, rapid injection of a sample collected using sample extraction device 100 or sample extraction device 150 can be performed using a system 200 that includes an SVOC focuser 234 and a VOC focuser 240, as will now be described with reference to FIG. 2.

Figure 2:
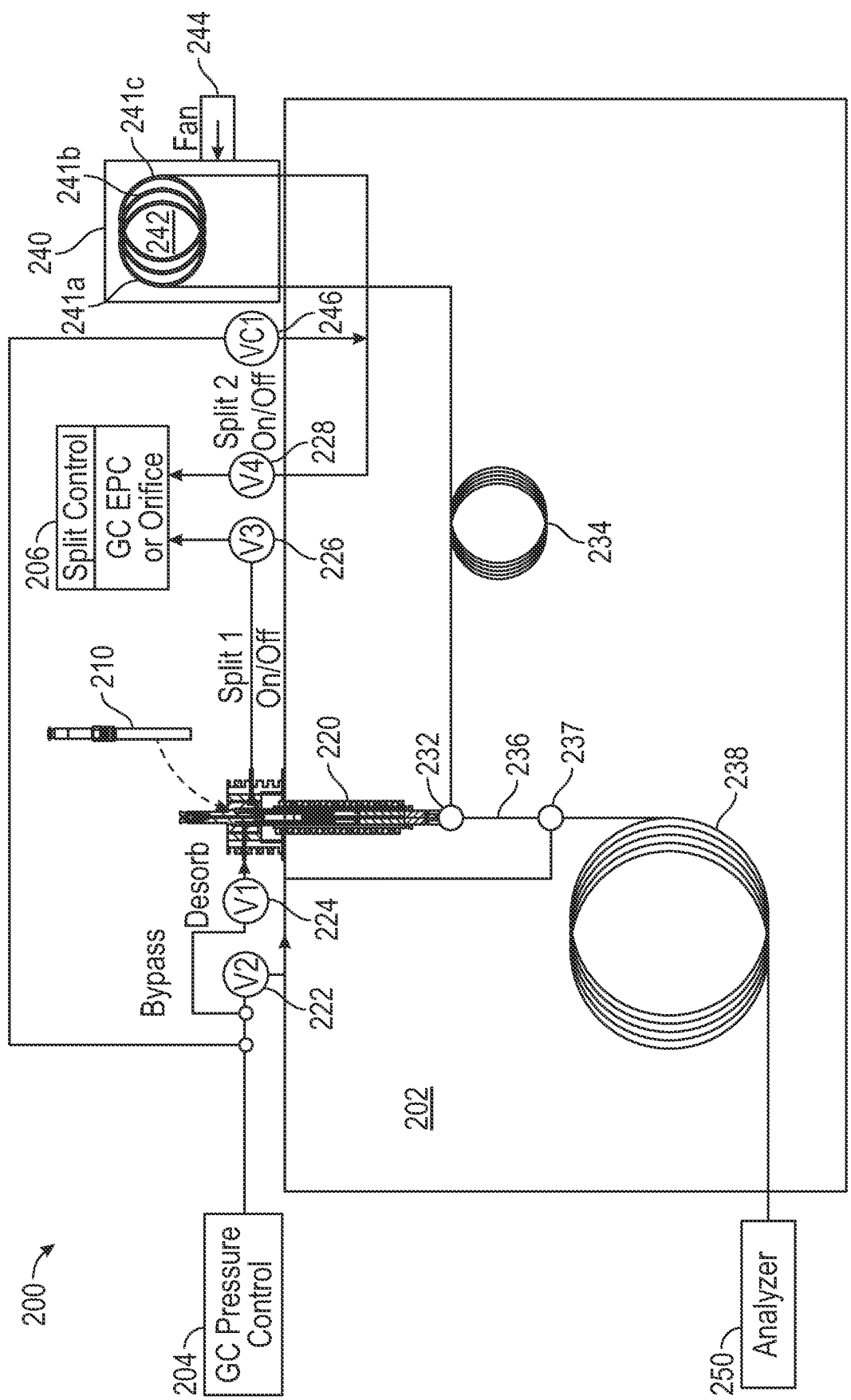
FIG. 2 illustrates an exemplary chemical analysis system according to some embodiments of the disclosure.

FIG. 2 illustrates an exemplary chemical analysis system 200 according to some embodiments of the disclosure. In some embodiments, system 200 can include a GC oven 202 containing a thermal desorber 220, SVOC focuser 234, analytical column 238, connections 232 and 237, and restrictor 236. that is fluidly coupled to a VOC focuser 240, an analyzer 250, a pressure control system 204, GC split control system 206, and a plurality of valves 222, 224, 226, 228, and 246. In some embodiments, the VOC focuser 240 includes a plurality of capillary columns 241*a-c* disposed within a heater 242, a backflush desorb gas valve 246, and a fan 244. Placing the VOC focuser 240 in a dedicated heater 242 can allow the system 200 to control the temperatures of the SVOC focuser 234 and the VOC focuser 240 independently from each other.

The inside of the GC oven 202 can be heated convectively to achieve a consistent temperature throughout, for example. The GC has a pressure control system 204 that can achieve a predetermined flow rate through the analytical GC column 238 based on the dimensions of the column 238, the temperature of the GC oven 202, and the makeup of the carrier gas (e.g., Helium, Hydrogen, etc.). The GC also includes a split controller 206 that can maintain a flow rate of carrier gas out through a split point to a vent. Therefore, pressure control system 204 can control the flow rate through the GC column via pressure, which can be adjusted based on the column dimensions and GC oven 202 temperature, while the split control 206 can control the flow rate out of a split port. In some embodiments, the pressure control system 204 and split control 206 can achieve a consistent split ratio. In some embodiments, the split control 206 can be used to control the desorb flow through both an SVOC focuser 234 and a VOC focuser 240, without splitting the sample, as will be explained below. Thus, although system 200 includes GC split control system 206, the system 200 can perform a splitless injection of the sample, including both the SVOCs and VOCs of interest.

In some embodiments, the (e.g., direction of the) flow of gas (e.g., carrier gas, sample, water, air, etc.) in the system 200 is controlled by valves 222, 224, and 226. Valve 222 can allow carrier gas flow to bypass the sample extraction device 210 while sample extraction device 210 is inserted into the thermal desorber 220, so that the flow of gas can be maintained through the analytical column 238. Valve 224 can allow the carrier gas to be delivered through the sample extraction device 210 for delivering into the GC oven 202. Valve 226 can facilitate a final bakeout of the sample extraction device 210 and can also facilitate a final backflush of the system 200 to eliminate very heavy, unwanted compounds, as will be described later. In some embodiments, valves 228 and 246 can control the flow of gas through the VOC focuser 240 and/or SVOC focuser 234. Thus, in some embodiments, flow of gas in the system 200 can be controlled by valves 222, 224, 226, 228, and 246 and restrictor 236 without the use of rotary valves.

In some embodiments, thermal desorber 220 can desorb the sample from the sample extraction device 210 while the sample extraction device 210 is inserted into the thermal desorber 220. As the sample is desorbed from the sample extraction device 210, it can first pass through a connection 232, then through the SVOC focuser 234, and then—for the lighter VOC sample compounds that are unretained within SVOC focuser 234—into the VOC focuser 240.

In some embodiments, when preparing to desorb a sample from sample extraction device 210, the previous sample extraction device 210 or blank tube can be removed from thermal desorber 220, and the new sample extraction device 210 is inserted. During this time, for example, valve 222 can be on, allowing flow of carrier gas to the analytical column 238, and some backflow of carrier gas out through thermal desorber 220. In some embodiments, the flow of carrier gas can prevent air from entering the system 200, which could cause contamination of the system 200 and/or introduction of water into the system 200. After the sample extraction device 210 is inserted into thermal desorber 220, and the carrier gas stabilizes, the sample extraction device 210 can either be preheated under zero flow (only valve 222 open), or desorption can occur without pre-heating.

During desorption, for example, valves 222, 224, and 228 can be open and valves 226 and 246 can be closed. By opening both valves 222 and 224 simultaneously, the pressure at connections 232 and 237 can be substantially the same, as the pressure drop across the sorbent of the sample extraction device 210 in the thermal desorber 220 and the pressure drop across the delivery line from valve 222 to connection 237 can be substantially the same, thereby reducing or substantially eliminating the pressure drop across restrictor 236 between connection 232 and connection 237. For example, while the pressures at connection 232 and connection 237 are the same, then (e.g., substantially) no flow occurs across restrictor 236. Thus, (e.g., substantially) all of the desorbed sample from the sample extraction device 210 will be directed through thermal desorber 220 and connection 232 towards SVOC focusing column 234, VOC focuser 240, and valve 228.

In some embodiments, during and/or following desorption, a portion of the sample (e.g., SVOC target compounds) can be retained by the SVOC focuser 234, a portion of the sample (e.g., VOC target compounds) can be retained by the VOC focuser 240, and a portion of the sample (e.g., water vapor, air) and carrier gas can exit the system 200 through valve 228. For example, gas can flow from the thermal desorber 220, through the SVOC focuser 234 where one or more SVOC compounds can be deposited, through the VOC focuser 240 where one or more VOC compounds can be deposited, and out of the system through valve 228, including allowing air, water, and carrier gas to exit the system 200. In some embodiments, while gas flows from the thermal desorber 220 to valve 228, the temperature of oven 242 can be warmer than the temperature of the GC oven 202 (e.g., by 5° C.) to prevent condensation of water vapor, thereby facilitating removal of water from the system 200. The flow through the SVOC focusing trap 234 and the VOC focusing trap 240 can be controlled by the GC split control 206 and/or by a simple orifice, and flow can start or stop based on whether valve 228 is opened (e.g., to facilitate flow) or closed (e.g., to prevent flow) while valves 222 and 224 can remain open, for example.

In some embodiments, after a sufficient amount of gas is desorbed through sorbent device 210 in thermal desorber 220 to deliver the sample into SVOC focuser 234 and VOC focuser 240, valve 224 can be turned off while valves 222 and 228 can remain on, allowing bypass gas introduced at connection 237 to flow both to the analytical column 238 and through restrictor 236 to the SVOC focuser 234 and the VOC focuser 240 in a direction from connections 237 and 232 towards valve 228. This additional flow can purge out air and water vapor still remaining in the focusing traps 234 and 240 after sample delivery to the traps 234 and 240. For example, the water and air can traverse focusing traps 234 and 240 and exit the system through valve 228. Then, valve 228 can be closed to stop the flow of gas through the SVOC focuser 234 and the VOC focuser, for example.

In some embodiments, to perform a rapid, splitless injection, the VOC focuser 242 can be preheated under zero flow (e.g., while valve 228 is off), and then valve 222 can be turned off and valve 246 can be turned on while valve 224 is off to cause a flow of gas from the VOC focuser 242 towards the SVOC focuser 234 and towards the analytical column 238. Valve 246 can provide carrier gas to backflush the sample from the VOC focusing trap 240 to deliver it quickly to the analytical column 238 by flowing through VOC trap 234, connection 232, restrictor 236, and connection 237.

In some embodiments, once the compounds of interest reach the analytical column 238 from the VOC focuser 240 and SVOC focuser 234, the chemical analysis (e.g., GC or GCMS) can be started, including data collection from the analyzer 250 (e.g., an MS or other detector). Carrier gas flow from valve 246, through focusers 240 and 234, to the analytical column 238 can continue until all compounds of interest have been delivered from VOC focuser 240 and SVOC focuser 234 onto analytical column 238, for example. For example, during transfer, valve 246 can be on and valves 222, 224, 226, and 228 can be off. In some embodiments, "strength" (e.g., chemical affinity to one or more compounds of interest in the sample) of SVOC focuser 234 can be chosen to be less than that of the analytical column 238 to ensure that the SVOC compounds of interest further focus into narrow peaks upon delivery to analytical column 238 (e.g., through dynamic focusing). In some embodiments, the "strength" of the SVOC focuser 234 and analytical column 238 can be controlled by selecting the film or sorbent type or thickness, inner diameter, length, etc. of the SVOC focuser 234 and analytical column 238.

In some embodiments, once all compounds of interest have been backflushed from SVOC trap 234 to analytical column 238, valve 222 can be turned on, while valve 246 remains on and valves 224, 226, and 228 remain off, to elute all compounds through the analytical column 238 to the analyzer 250. While valve 222 is turned on and once the compounds of interest have reached the analytical column 238, valve 226 can also be opened, while valves 246 and 222 remain on and valves 224 and 228 remain off, to allow continued backflushing of VOC focuser 240 and SVOC focuser 234, with delivery out through the GC split control 206. In this way, very heavy compounds that were delivered to and remain retained by SVOC focuser 234 that are of no interest, or which are so heavy that they would require too high a GC oven temperature, or too much time, to elute to the analyzer 250 can be removed more effectively and in a shorter period of time.

Figure 3:
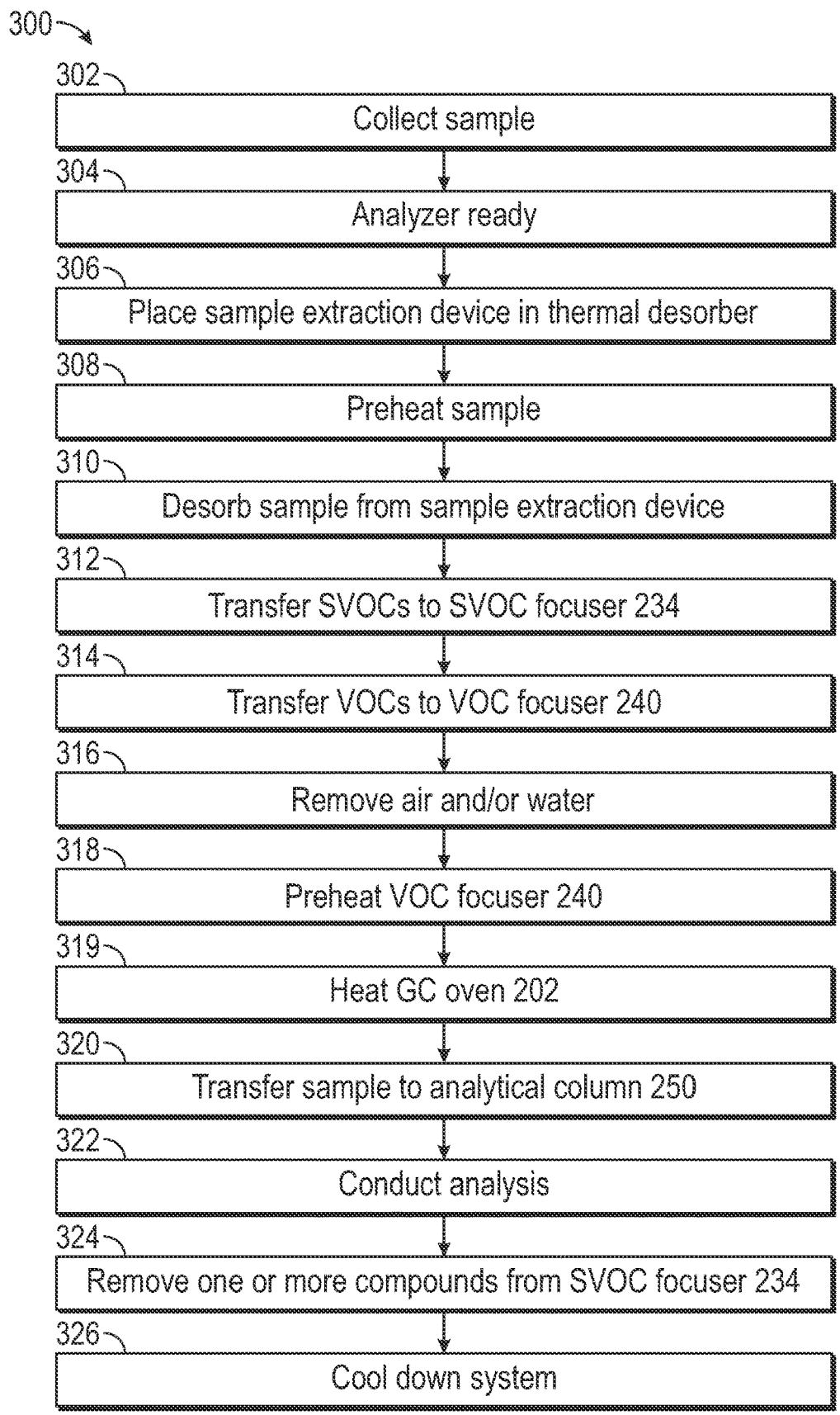
FIG. 3 illustrates an exemplary process for conducting a chemical analysis according to some embodiments.

FIG. 3 illustrates an exemplary process 300 for conducting a chemical analysis according to some embodiments. In some embodiments, the chemical analysis process 300 includes collecting 302 a sample, such as by performing an extraction of organic compounds with a sample extraction device 100, 150, or 210, or another sample delivery system. In some embodiments, pre-collection of a sample on a sorbent bed can be done by diffusive sampling at atmospheric pressure, diffusive sampling under vacuum conditions, or active sampling by drawing a known volume of gas to be analyzed through the sorbent.

In some embodiments, when the analyzer 250 (e.g., a GC or other detector) is ready 304 for the next analysis, the sample extraction device 210 can be placed 306 into thermal desorber 220 as shown in FIG. 2 while carrier gas is being supplied in and out of the system through valves 222 and 226 while valves 224 and 228 are closed, the GC oven 202 is at a temperature in the range of 35-50° C., the heater 242 of the VOC focuser 240 is 5° C. hotter than the GC oven 202, and the thermal desorber 220 is at a temperature in the range of 40-80° C.

In some embodiments, while the sample extraction device 210 is disposed in the thermal desorber 220, valve 226 can be turned off and valve 228 can be turned on during preheat 308 of the sample in the sample extraction device 210 in the thermal desorber 220. In some embodiments, during preheating, the thermal desorber 220 can be heated to a desorption temperature in the range of 100-250° C. (e.g., while the GC oven 202 remains at a temperature in the range of 35-50° C. and the heater 242 of the VOC focuser 240 is 5° C. hotter than the GC oven 202).

In some embodiments, the sample can be desorbed 310 from the sample extraction device 210 in the thermal desorber 220 by leaving valves 222 and 228 on, and also turning on valve 224 to start the desorption flow through thermal desorber 220, connection 232, SVOC focuser 234, and VOC focuser 240 towards valve 228 while valve 246 and 226 are closed. In some embodiments, during desorption, the thermal desorber can be at a temperature in the range of 150-320° C. (e.g., while the GC oven 202 remains at a temperature in the range of 35-50° C. and the heater 242 of the VOC focuser 240 is 5° C. hotter than the GC oven 202). During this 1-6-minute desorption, the heavier SVOCs from the sample can be transferred 312 to the SVOC focuser 234 and the VOCs from the sample can be transferred 314 to the VOC focuser 240.

After the desorption is completed and while the SVOCs and VOCs of interest are retained by the SVOC focuser 234 and VOC focuser 240, respectively, valve 224 can be turned off while valves 222 and 228 are on. In some embodiments, this configuration can allow carrier gas to flow through restrictor 236, connection 232, SVOC focuser 234, and VOC focuser 240 to remove 316 any remaining air and water vapor out through vent 228. In some embodiments, the process can be performed for 1-5 minutes. In some embodiments, while the air and/or water are being dry-purged from the system 200, the GC oven 202 remains at a temperature in the range of 35-50° C. and the heater 242 of the VOC focuser 240 is 5° C. hotter than the GC oven 202. At this time, for example, the heater of the thermal desorber 220 can be turned off to cool down the thermal desorber 220, sample extraction device 210, and connection 232. Turning off the heater of the thermal desorber 220 in this way can reduce or eliminate thermal disturbances, such as thermal expansion of gases, for example, that can otherwise affect the proper, rapid transfer of compounds from the VOC focuser 240 and SVOC focuser 234 to analytical column 238 through connections 232 and 237 and restrictor 236 (e.g., later in the process).

In some embodiments, after removing (e.g., all of, substantially all of) the water and air from the system 200, valve 228 can be turned off to stop the flow through the SVOC focuser 234 and VOC focuser 240, and the VOC focuser 240 can be preheated 318 (e.g., with heater 242) to a desorption temperature in the range of 80-300° C. (e.g., 80-200° C.), for example. In some embodiments, while the VOC focuser 240 is being preheated, the GC oven 202 can remain at the temperature in the range of 35 to 50° C.

In some embodiments, during or after preheating the VOC focuser 240 (e.g., and while the VOC focuser 240 is at a temperature in the range of 80-300° C. (e.g., 120-200° C.)), valves 246 and 228 can be turned on and valves 222, 224, and 226 can be turned off. This configuration can transfer 320 the sample to the analytical column 250 by directing the sample from the VOC focuser 240 through the SVOC focuser 234, through restrictor 236, and to the analytical column 238 while the GC oven 202 is at the temperature in the range of 35-50° C., for example.

In some embodiments, after preheating the VOC focuser 240 (e.g., and before, after, or during transfer of the VOCs from the VOC focuser 240 to the SVOC focuser 234 and/or analytical column 238), the GC oven 202 can be heated 319 from the temperature in the range of 35-50° C. to a temperature in the range of 240-340° C. In some embodiments, the GC oven 202 can be heated at a rate of 2 to 20° C. per minute. While heating the GC oven 202, valves 246 and 228 can remain on and valves 222, 224, and 226 can remain off. In some embodiments, this configuration of valves and the heating of the GC oven 202 can cause the SVOCs to (e.g., start to) transfer from the SVOC trap 234 towards the analytical column 238.

In some embodiments, after transferring the sample to the analytical column 238, the chemical (e.g., GC or GCMS) analysis can be conducted 322. The GC oven 202 can increase in temperature to complete the transfer of all compounds of interest through SVOC focuser 234 and restrictor 236 onto analytical column 238.

In some embodiments, once the compounds of interest have been transferred to the analytical column 238 (e.g., from the SVOC focuser 234 and the VOC focuser 240), one or more heavy compounds remaining in the SVOC focuser 234 that are not of interest for analysis can be removed 324 from the system 200. In some embodiments, removing these compounds can include leaving valve 246 on and turning on valves 222 and 226. This configuration can facilitate flow of the remaining, undesirable compounds from the SVOC focuser 234 to the split port 226, while valve 222 flushes the compounds of interest in the analytical column 238 to the analyzer 250. The system can remain in this configuration with valves 246, 222, and 226 on and the remaining valves off until the analysis is complete. In some embodiments, valve 224 can be turned on during this time to facilitate bakeout of the sample extraction device 210 (e.g., through valve 226) to clean the sample extraction device 210 to prepare it for reuse. In some embodiments, the sample extraction device 210 and the thermal desorber 220 are at a temperature higher than (e.g., 20° C. higher than) the temperature of the sample extraction device 210 and thermal desorber 220 during desorption 310 of the sample from the sample extraction device 210.

In some embodiments, after analyzing the compounds of interest, the system can be cooled down 326, including cooling the GC oven 202 and the heater 242 of the VOC focuser 240. During cooling, valves 222 and 226 can remain on and valve 246 can be turned off, for example, which can stop the flow of gas through the VOC focuser 240. In some embodiments, once the analyzer 250 is cool and ready for the next analysis, the process can be repeated with a subsequent sample (e.g., provided in a new sample collection device 210).

Figure 4:
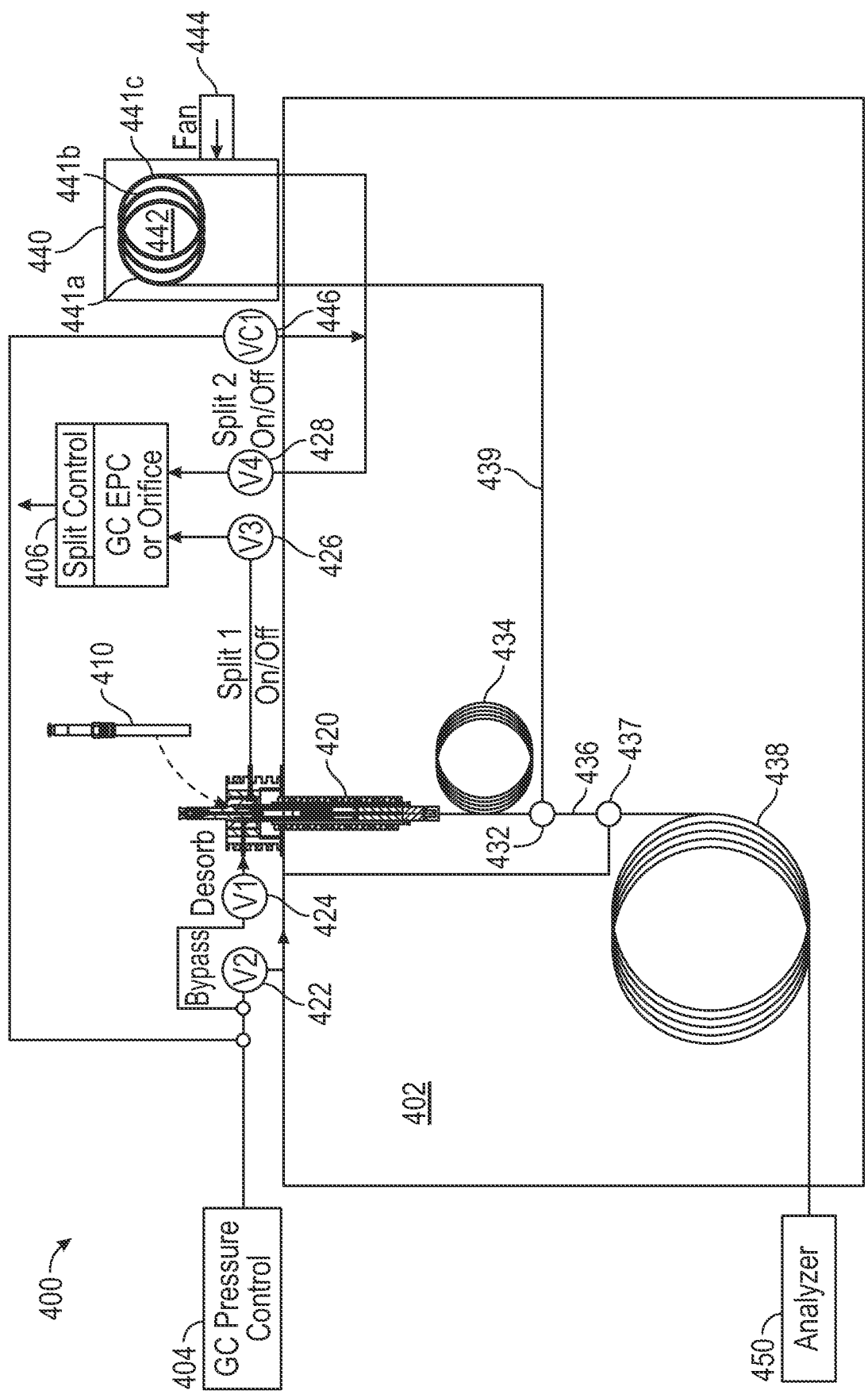
FIG. 4 illustrates an exemplary chemical analysis system according to some embodiments of the disclosure.

FIG. 4 illustrates an exemplary chemical analysis system 400 according to some embodiments of the disclosure. System 400 can include a number of components that are the same as or similar to the components of system 200 described above with reference to FIG. 2. For example, system 400 can include a GC oven 402 (e.g., similar to GC oven 202 described above with reference to FIG. 2) containing a thermal desorber 420 (e.g., similar to thermal desorber 220 described above with reference to FIG. 2), SVOC focuser 434 (e.g., similar to SVOC focuser 234) described above with reference to FIG. 2), analytical column 438 (e.g., similar to analytical column 238 described above with reference to FIG. 2), connections 432 and 437 (e.g., similar to connections 232 and 237 described above with reference to FIG. 2), non-coated, non-retentive column 439, and restrictor 436 (e.g., similar to restrictor 236 described above with reference to FIG. 2). In some embodiments, the GC oven 402 and one or more components therein are fluidly coupled to a VOC focuser 440 (e.g., similar to VOC focuser 240 described above with reference to FIG. 2), an analyzer 450 (e.g., similar to analyzer 250 described above with reference to FIG. 2), a pressure control system 404 (e.g., similar to pressure control system 204 described above with reference to FIG. 2), GC split control system 406 (e.g., similar to GC split control system 206 described above with reference to FIG. 2), and a plurality of valves 422, 424, 426, 428, and 446 (e.g., similar to valves 222, 224, 226, 228, and 246 described above with reference to FIG. 2). In some embodiments, the VOC focuser 440 includes a plurality of capillary columns 441a-c (e.g., similar to capillary columns 241a-c described above with reference to FIG. 2) disposed within a heater 442 (e.g., similar to heater 242 described above with reference to FIG. 2), a backflush desorb gas valve 446 (e.g., similar to backflush desorb gas valve 246 described above with reference to FIG. 2), and a fan 444 (e.g., similar to fan 244 described above with reference to FIG. 2).

In some embodiments, system 400 can operate similarly to system 200 described above with reference to FIG. 2, such as the operation of valves 422, 424, 426, 446, and 428 being similar to the operation of valves 222, 224, 226, 246, and 228 described above with reference to FIG. 2. Unlike system 200, however, system 400 includes SVOC focuser 434 coupled between thermal desorber 420 and connection 432, for example. In some embodiments, during desorption, the compounds of the sample (e.g., collected using sample extraction device 410) can flow from the sample extraction device 410 in the thermal desorber 420 towards the SVOC focuser 434, with the SVOC and heavier compounds being retained by the SVOC focuser 434 and the lighter VOC compounds and any air or water included in the system traversing the SVOC focuser 434 and proceeding through non-retentive column 439 towards VOC focuser 440. In some embodiments, when the VOC focuser 440 is desorbed (e.g., after air and water have been removed from the system through valve 428), flow of the VOC compounds from the sample can be facilitated from the VOC focuser 440, through non-retentive column 439, connection 432, restrictor 436, and connection 437 and into analytical column 438. In some embodiments, when the SVOC focuser 434 is desorbed, flow of the SVOCs proceeds in the same direction as the direction of flow of the SVOC compounds during desorption of the sample extraction device 410 (e.g., from the end of the SVOC focuser 434 coupled to thermal desorber 420 towards the end of the SVOC focuser 434 coupled to connection 432), through connection 432, restrictor 436, and connection 437, and into analytical column 438. In some embodiments, the SVOC compounds dynamically re-focus while traversing analytical column 438, thereby reducing the bandwidth of these compounds. In some embodiments, after the VOC focuser 434 is desorbed in this manner, valves 424 and 426 can be opened to continue the elution of the SVOCs through the SVOC focuser 434 and bake out the sample extraction device 420 and sample extraction device 420.

Figure 5:
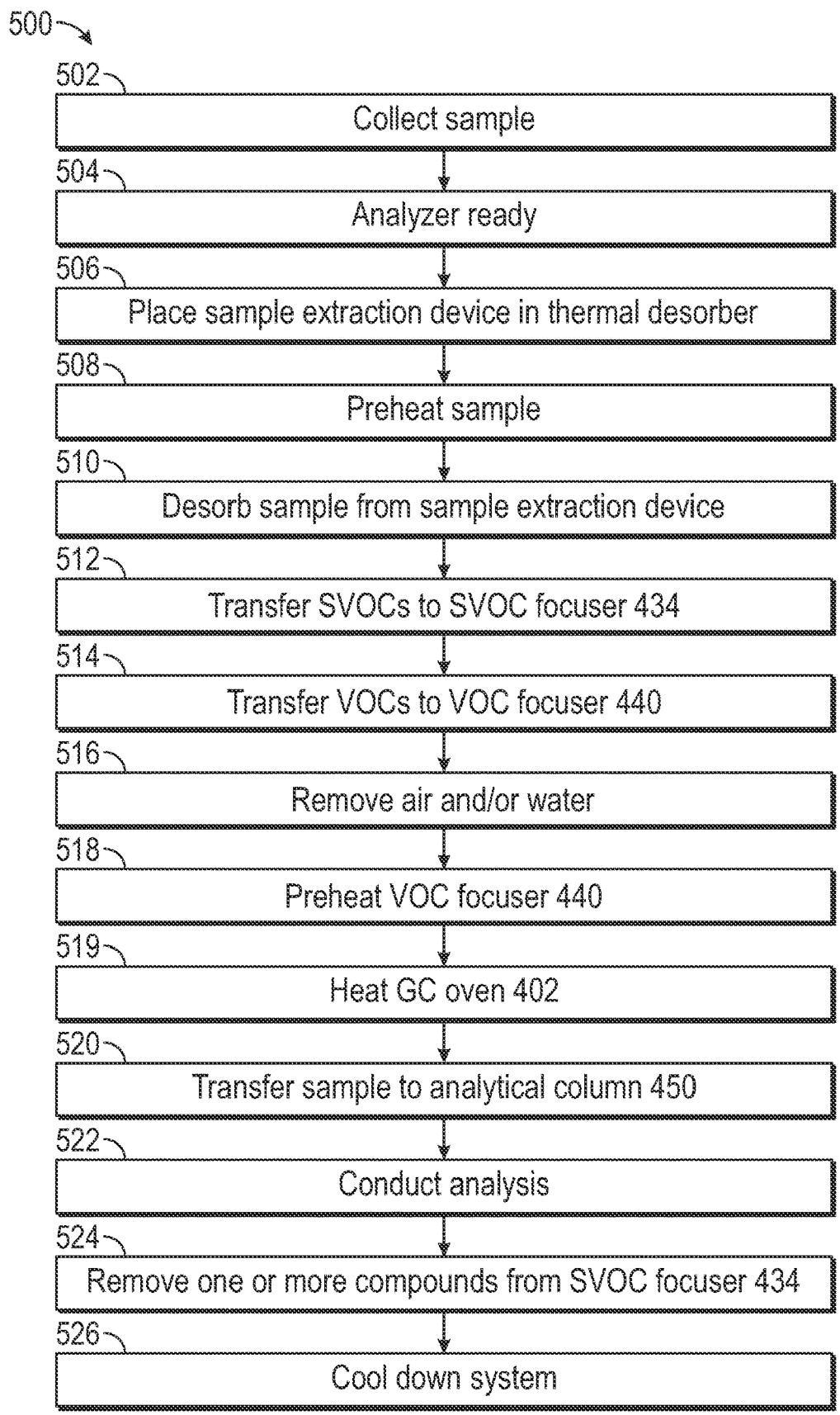
FIG. 5 illustrates an exemplary process for conducting a chemical analysis according to some embodiments.

FIG. 5 illustrates an exemplary process 500 for conducting a chemical analysis according to some embodiments. In some embodiments, the chemical analysis process 500 includes collecting 502 a sample, such as by performing an extraction of organic compounds with a sample extraction device 100, 150, or 210, or another sample delivery system. In some embodiments, pre-collection of a sample on a sorbent bed can be done by diffusive sampling at atmospheric pressure, diffusive sampling under vacuum conditions, or active sampling by drawing a known volume of gas to be analyzed through the sorbent.

In some embodiments, when the analyzer 450 (e.g., a MS or other detector) and oven 402 are ready 504 for the next analysis, the sample extraction device 410 can be placed 506 into thermal desorber 420 as shown in FIG. 4 while carrier gas is being supplied in and out of the system through valves 422 and 426 while valves 424 and 428 are closed, the GC oven 402 is at a temperature in the range of 35-50° C., the heater 442 of the VOC focuser 440 is 5° C. hotter than the GC oven 402, and the thermal desorber 420 is at a temperature in the range of 40-80° C.

In some embodiments, while the sample extraction device 410 is disposed in the thermal desorber 420, valve 426 can be turned off and valve 428 can be turned on during preheat 508 of the sample in the sample extraction device 410 in the thermal desorber 420. In some embodiments, during pre-heating, the thermal desorber 420 can be heated to a desorption temperature in the range of 100-250° C. (e.g., while the GC oven 402 remains at a temperature in the range of 35-50° C. and the heater 442 of the VOC focuser 240 is 5° C. hotter than the GC oven 402).

In some embodiments, the sample can be desorbed 510 from the sample extraction device 410 in the thermal desorber 420 by leaving valves 422 and 428 on, and also turning on valve 424 to start the desorption flow through thermal desorber 420, connection 432, SVOC focuser 434, and VOC focuser 440 towards valve 428 while valve 446 and 426 are closed. In some embodiments, during desorption, the thermal desorber can be at a temperature in the range of 150-320° C. (e.g., while the GC oven 402 remains at a temperature in the range of 35-50° C. and the heater 442 of the VOC focuser 440 is 5° C. hotter than the GC oven 402). During this 1-6-minute desorption, the heavier SVOCs from the sample can be transferred 512 to the SVOC focuser 434 and the VOCs from the sample can be transferred 514 to the VOC focuser 440.

After the desorption is completed and while the SVOCs and VOCs of interest are retained by the SVOC focuser 434 and VOC focuser 440, respectively, valve 424 can be turned off while valves 422 and 428 are on. In some embodiments, this configuration can allow carrier gas to flow through restrictor 436, connection 432, SVOC focuser 434, non-retentive column 439, and VOC focuser 440 to remove 516 any remaining air and water vapor out through vent 428. In some embodiments, the process can be performed for 1-5 minutes. In some embodiments, while the air and/or water are being dry-purged from the system 400, the GC oven 402 remains at a temperature in the range of 35-50° C. and the heater 442 of the VOC focuser 440 is 5° C. hotter than the GC oven 402. At this time, for example, the heater of the thermal desorber 420 can be turned off to cool down the thermal desorber 420, sample extraction device 410, and connection 432.

In some embodiments, after removing (e.g., all of, substantially all of) the water and air from the system 400, valve 428 can be turned off to stop the flow through the SVOC focuser 434 and VOC focuser 440, and the VOC focuser 440 can be preheated 518 (e.g., with heater 442) to a desorption temperature in the range of 80-300° C. (e.g., 80-200° C.), for example. In some embodiments, while the VOC focuser 440 is being preheated, the GC oven 402 can remain at the temperature in the range of 35 to 50° C.

In some embodiments, during or after preheating the VOC focuser 440 (e.g., and while the VOC focuser 440 is at a temperature in the range of 80-300° C. (e.g., 120-200° C.)), valves 446 and 428 can be turned on and valves 422, 424, and 426 can be turned off. This configuration can transfer 520 the sample to the analytical column 450 by directing the sample from the VOC focuser 440 through non-retentive column 439, through restrictor 436, and to the analytical column 438 while the GC oven 402 is at the temperature in the range of 35-50° C., for example.

In some embodiments, after preheating the VOC focuser 440 (e.g., and before, after, or during transfer of the VOCs from the VOC focuser 440 to the analytical column 438), the GC oven 402 can be heated 519 from the temperature in the range of 35-50° C. to a temperature in the range of 240-340° C. In some embodiments, the GC oven 402 can be heated at a rate of 2 to 20° C. per minute. In some embodiments, after desorbing the VOCs from VOC focuser 440, valves 446 and 428 can be turned off and valves 424 and 426 can be turned on to flush the SVOCs from SVOC focuser 434 towards the analytical column 438 while heating the GC oven 402.

In some embodiments, after transferring the sample to the analytical column 438, the chemical (e.g., GC or GCMS) analysis can be conducted 522. The GC oven 402 can increase in temperature to complete the transfer of all compounds of interest from SVOC focuser 434, through restrictor 436 onto analytical column 238.

In some embodiments, once the compounds of interest have been transferred to the analytical column 438 (e.g., from the SVOC focuser 434 and the VOC focuser 440), one or more heavy compounds remaining in the SVOC focuser 434 that are not of interest for analysis can be removed 524 from the system 400. In some embodiments, removing these compounds can include leaving valve 446 on and turning on valves 422 and 426. This configuration can facilitate flow of the remaining, undesirable compounds from the SVOC focuser 434 to the split port 426, while valve 422 flushes the compounds of interest in the analytical column 438 to the analyzer 450. The system can remain in this configuration with valves 446, 422, and 426 on and the remaining valves off until the analysis is complete. In some embodiments, valve 424 can be turned on during this time to facilitate bakeout of the sample extraction device 410 (e.g., through valve 426) to clean the sample extraction device 410 to prepare it for reuse. In some embodiments, the sample extraction device 410 and the thermal desorber 420 are at a temperature higher than (e.g., 20° C. higher than) the temperature of the sample extraction device 410 and thermal desorber 420 during desorption 510 of the sample from the sample extraction device 410.

In some embodiments, after analyzing the compounds of interest, the system can be cooled down 526, including cooling the GC oven 402 and the heater 442 of the VOC focuser 440. During cooling, valves 422 and 426 can remain on and valve 446 can be turned off, for example, which can stop the flow of gas through the VOC focuser 440. In some embodiments, once the analyzer 450 is cool and ready for the next analysis, the process can be repeated with a subsequent sample (e.g., provided in a new sample collection device 410).

In some embodiments, the systems and methods described above can achieve the following goals:

Both VOCs and SVOCs are 100% delivered to the analytical column 238 and to the analyzer 250 without splitting, thereby maximizing sensitivity VOCs are focused to optimize capillary column GC performance (maximized compound resolution)

Excess water vapor is eliminated (e.g., through valve 228) before it can affect chromatography, reducing hydrolysis of the analytical column 238, and eliminating suppression within the analyzer 250

Elimination of cold spots or rotary valve rotors that would affect SVOC recovery Elimination of moving parts in the flow path (rotary valves, solenoid valves), that would reduce system longevity Elimination of packed traps and liquid nitrogen, that can have negative effects on performance Therefore, in some embodiments, techniques disclosed herein can use an SVOC focuser 234 disposed in a GC oven 202 and a VOC focuser 240 attached to the GC oven 202 to complete sample preparation processes, including eliminating residual water, air, and other undesirable fixed gases in a sample, reducing the sample volume, and rapidly injecting the compounds of interest into an analyzer 250 (e.g., a GC or GCMS). In some embodiments, both VOCs and SVOCs can be analyzed in a single analysis using a splitless injection to transfer 100% of the compounds of interest of the sample to the analyzer 250 in order to maximize the sensitivity of the analytical technique.

Techniques disclosed herein can be used in the analysis of chemicals in waste water, drinking water, sea water, soils, indoor and outdoor air, beverages such as wine and beer, spirits, consumer products, and many other applications where either trace level analysis is required, or where the volume of the original sample is limiting. Another application for this technique is the analysis of breath condensate in which an oral rinse is placed in a vial where it is extracted under vacuum using sample extraction device 100, 150, and/or 210 to recover volatile through semi-volatile compounds originating within the body where trace level analysis is required for detection of various diseases, for example. In some embodiments, other biological fluids and/or tissues can likewise be vacuum extracted to recover their volatile and semi volatile content for metabolomic research and for detection of disease markers. In addition, chemical warfare agents in air, water, or breath condensate can also be analyzed at ultra-trace levels (part per quadrillion), and sample extraction devices 100, 150, and/or 210 can be placed on drones to collect samples remotely in search of CWAs or signatures indicating illicit drug laboratory operations. Some embodiments can be used to analyze the widest range of boiling points, at the lowest detection limits possible, with the least amount of system contamination and carryover. Some embodiments of the disclosure relate to a system comprising a first oven containing an SVOC focuser and an analytical column; a thermal desorber fluidly coupled to the SVOC focuser and analytical column; a VOC focuser fluidly coupled to the SVOC focuser; a plurality of valves configured to: introduce a first flow of sample from the thermal desorber, through the SVOC focuser towards the VOC focuser, wherein the SVOC focuser is configured to retain first compounds and the VOC focuser is configured to retain second compounds; after the SVOC focuser retains the first compounds and the VOC focuser retains second compounds, introduce a second flow of the sample from the VOC focuser and the SVOC focuser to the analytical column, wherein the second flow transfers the first compounds and second compounds to the analytical column; and an analyzer fluidly coupled to the analytical column, wherein the analyzer is configured to conduct a chemical analysis of the first and second compounds after the first and second compounds traverse the analytical column. Additionally or alternatively, in some embodiments, the system further includes a first valve coupled to a GC split controller, wherein the first valve is open while the first flow of sample is introduced. Additionally or alternatively, in some embodiments, the system further includes a second oven different from the first oven, the second oven containing the VOC focuser. Additionally or alternatively, in some embodiments, while introducing the first flow of sample, the system heats the second oven to a higher temperature than the first oven. Additionally or alternatively, in some embodiments, the first flow includes removing one or more of water or air from the system through a valve coupled to the VOC focuser. Additionally or alternatively, in some embodiments, the chemical analysis is performed based on a single, splitless injection of the sample including SVOCs and VOCs. Additionally or alternatively, in some embodiments, the SVOC focuser is configured to retain third compounds, and the plurality of valves are further configured to, after the first compounds and second compounds are transferred to the analytical column, remove the third compounds from the system. Additionally or alternatively, in some embodiments, the system further includes a restrictor disposed between a connection of the thermal desorber and the SVOC focuser and the analytical column, the restrictor fluidly coupled to the thermal desorber, SVOC focuser, and analytical column.

Some embodiments are directed to a method comprising introducing, via a plurality of valves, a first flow of sample from a thermal desorber, through the SVOC focuser towards the VOC focuser; while introducing the first flow: retaining, with the SVOC focuser, first compounds; and retaining, via the VOC focuser, second compounds; after the SVOC focuser retains the first compounds and the VOC focuser retains second compounds: introduce, via the plurality of valves, a second flow of the sample from the VOC focuser and the SVOC focuser to an analytical column, wherein the second flow transfers the first compounds and second compounds to the analytical column; after the first and second compounds traverse the analytical column: conduct a chemical analysis, via an analyzer fluidly coupled to the analytical column, of the first and second compounds. Additionally or alternatively, in some embodiments, introducing the first flow of the sample includes opening a first valve coupled to a GC split controller. Additionally or alternatively, in some embodiments, the method further includes, while introducing the first flow, heating, via a first oven, the SVOC focuser to a first temperature; and heating, via a second oven, the VOC focuser to a second temperature higher than the first temperature. Additionally or alternatively, in some embodiments, introducing the first flow includes removing one or more of air or water from the sample through a valve of the plurality of valves, the valve coupled to the VOC focuser. Additionally or alternatively, in some embodiments, the chemical analysis is conducted based on a single, splitless injection of the sample, the sample including SVOCs and VOCs. Additionally or alternatively, in some embodiments, the method further includes, while introducing the first flow and while introducing the second flow: retaining, via the SVOC focuser, third compounds; and after introducing the second flow: introducing, via the plurality of valves, a third flow to remove the third compounds from a system including SVOC focuser and the analytical column.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
a first oven containing an SVOC focuser and an analytical column;
a thermal desorber fluidly coupled to the SVOC focuser and analytical column;
a VOC focuser fluidly coupled to the SVOC focuser;
a plurality of valves configured to:
introduce a first flow of sample from a sample extraction device contained in the thermal desorber to the SVOC focuser, through the SVOC focuser towards the VOC focuser, wherein the SVOC focuser is configured to retain first compounds and the VOC focuser is configured to retain second compounds;
after the SVOC focuser retains the first compounds and the VOC focuser retains second compounds, introduce a second flow of the sample from the VOC focuser and the SVOC focuser to the analytical column, wherein the second flow transfers the first compounds and second compounds to the analytical column; and
an analyzer fluidly coupled to the analytical column, wherein the analyzer is configured to conduct a chemical analysis of the first and second compounds after the first and second compounds traverse the analytical column.

2. The system of claim 1, further comprising:
a first valve coupled to a GC split controller, wherein the first valve is open while the first flow of sample is introduced.

3. The system of claim 1, further comprising:
a second oven different from the first oven, the second oven containing the VOC focuser.

4. The system of claim 3, wherein, while introducing the first flow of sample, the system heats the second oven to a higher temperature than the first oven.

5. The system of claim 1, wherein the first flow includes removing one or more of water or air from the system through a valve coupled to the VOC focuser.

6. The system of claim 1, wherein the chemical analysis is performed based on a single, splitless injection of the sample including SVOCs and VOCs.

7. The system of claim 1, wherein:
the SVOC focuser is configured to retain third compounds, and
the plurality of valves are further configured to, after the first compounds and second compounds are transferred to the analytical column, remove the third compounds from the system.

8. The system of claim 1, further comprising:
a restrictor disposed between a connection of the thermal desorber and the SVOC focuser and the analytical column, the restrictor fluidly coupled to the thermal desorber, SVOC focuser, and analytical column.

9. A method comprising:
introducing, via a plurality of valves, a first flow of sample from a sample extraction device contained in a thermal desorber to a SVOC focuser, through the SVOC focuser towards a VOC focuser;
while introducing the first flow:
retaining, with the SVOC focuser, first compounds; and
retaining, via the VOC focuser, second compounds;
after the SVOC focuser retains the first compounds and the VOC focuser retains second compounds:

introducing, via the plurality of valves, a second flow of the sample from the VOC focuser and the SVOC focuser to an analytical column, wherein the second flow transfers the first compounds and second compounds to the analytical column;

after the first and second compounds traverse the analytical column:

conducting a chemical analysis, via an analyzer fluidly coupled to the analytical column, of the first and second compounds.

10. The method of claim 9, wherein introducing the first flow of the sample includes opening a first valve coupled to a GC split controller.

11. The method of claim 9, further comprising:
while introducing the first flow:
heating, via a first oven, the SVOC focuser to a first temperature; and
heating, via a second oven, the VOC focuser to a second temperature higher than the first temperature.

12. The method of claim 9, wherein introducing the first flow includes removing one or more of air or water from the sample through a valve of the plurality of valves, the valve coupled to the VOC focuser.

13. The method of claim 9, wherein the chemical analysis is conducted based on a single, splitless injection of the sample, the sample including SVOCs and VOCs.

14. The method of claim 9, further comprising:
while introducing the first flow and while introducing the second flow:
retaining, via the SVOC focuser, third compounds; and
after introducing the second flow:
introducing, via the plurality of valves, a third flow to remove the third compounds from a system including SVOC focuser and the analytical column.

* * * * *